ered in said body. The disc, when closed, is in the plane of the seating surface. The edge of the plate is in close spacing to the seating surface, and is correspondingly tapered. The edge of the plate has a rectangular groove having a cylindrical base and walls perpendicular to the base. An O-ring is seated in the groove, and provides a self energizing seal. Means are provided to center the disc in the seat. Means are provided to apply a selected torque to the shaft.

United States Patent
Webb

[11] 3,974,855
[45] Aug. 17, 1976

[54] CHECK VALVE HAVING SELF ENERGIZING SEAL

[75] Inventor: Anthony M. Webb, Tulsa, Okla.

[73] Assignee: Tesco Engineering Company, Tulsa, Okla.

[22] Filed: Sept. 30, 1975

[21] Appl. No.: 618,127

[52] U.S. Cl. .............................. 137/527.4; 251/84; 251/173; 251/307
[51] Int. Cl.² ......................................... F16K 15/00
[58] Field of Search .................... 137/527, 527.4; 251/304, 305, 306, 307, 308, 172, 173, 84

[56] References Cited
UNITED STATES PATENTS

| 3,172,424 | 3/1965 | Stillwagon | 137/527.4 |
| 3,230,971 | 1/1966 | Rosaen | 137/527 X |
| 3,314,642 | 4/1967 | Kautz | 251/307 |
| 3,521,857 | 7/1970 | Over | 251/305 |

FOREIGN PATENTS OR APPLICATIONS

| 873,117 | 7/1961 | United Kingdom | 251/306 |

Primary Examiner—Harold W. Weakley
Attorney, Agent, or Firm—Daniel Silverman

[57] ABSTRACT

An improved check valve having a housing or body with parallel faces and a substantially circular opening therethrough, and a shaft transverse to the opening. A flapper disc is rigidly attached to the shaft. A seat means comprising a metal ring is inserted into the upstream face of the body, and has a seating surface which is a truncated conical surface, tapering upstream. The conical surface is tangent to a sphere centered in said body. The disc, when closed, is in the plane of the seating surface. The edge of the plate is in close spacing to the seating surface, and is correspondingly tapered. The edge of the plate has a rectangular groove having a cylindrical base and walls perpendicular to the base. An O-ring is seated in the groove, and provides a self energizing seal. Means are provided to center the disc in the seat. Means are provided to apply a selected torque to the shaft.

7 Claims, 4 Drawing Figures

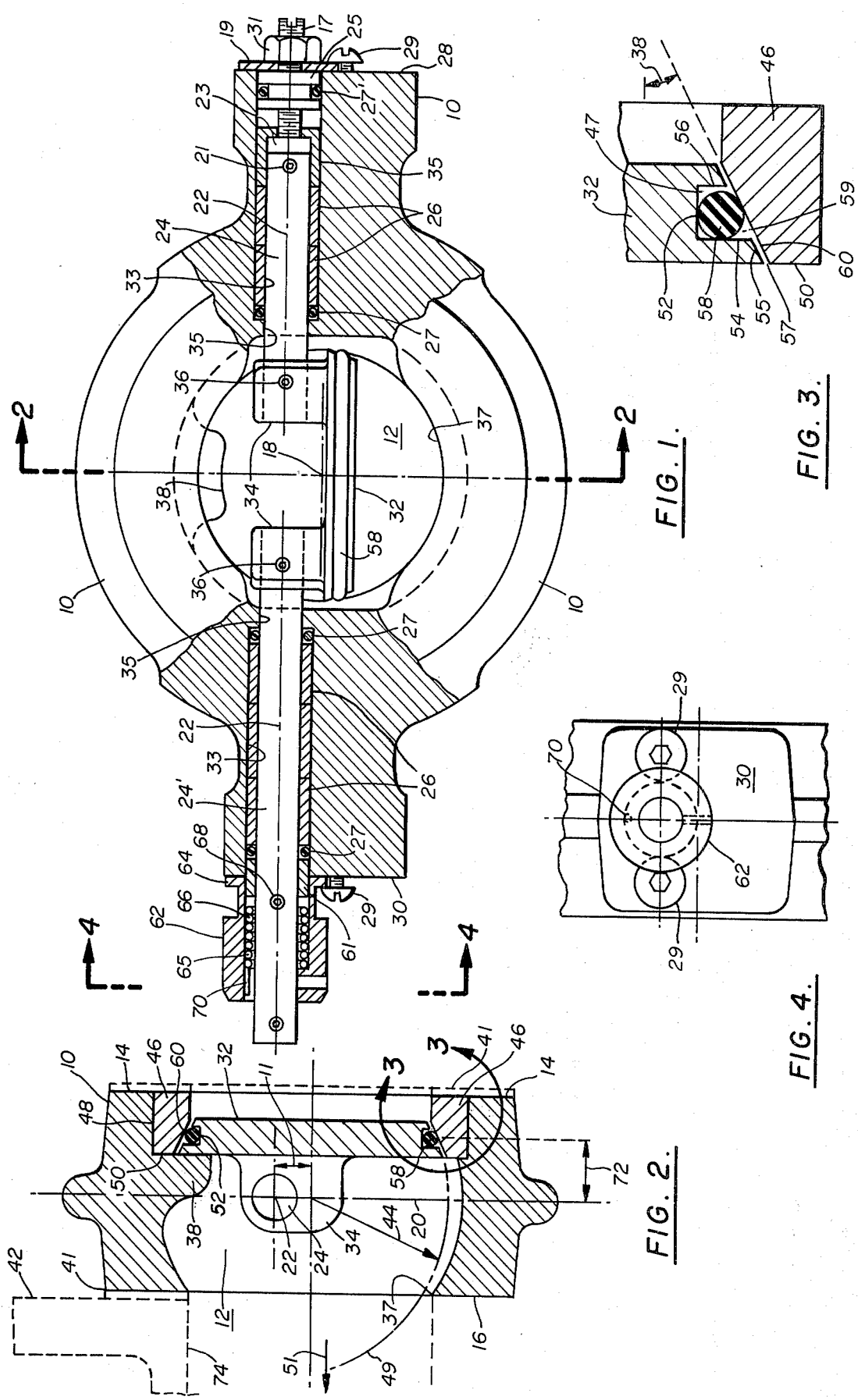

CHECK VALVE HAVING SELF ENERGIZING SEAL

BACKGROUND OF THE INVENTION

This invention lies in the field of fluid check valves. More particularly it concerns the type of check valves which have limited axial thickness, and are adapted to be inserted into a flow line, and clamped between opposed spaced flanges.

Still more particularly, this invention lies in the field of check valves which have self energizing seals, and can withstand back pressure without leaking fluid, even at low back pressures.

In the prior art check valves have generally been designed with planar sealing surfaces, and some sort of thin planar gasket means. Because of the nature of the seal, such valves require excessive back pressure to effectively seal fluid flow in the back direction.

SUMMARY OF THE INVENTION

It is a primary object of this invention to provide a check valve having a minimum of closing friction.

It is a further object to provide a check valve having a self energizing seal.

It is a further object to provide a check valve having means to precisely center the disc in its seat.

It is a still further object to provide a check valve including means to apply a selected value of torque on the disc shaft.

These and other objects are realized and the limitations of the prior art are overcome in this invention by providing a check valve in which the seating surface is a truncated conical surface, tapering upstream against the normal direction of free flow of fluid. This seating surface is tangent to a spherical surface centered on the axis of the fluid opening through the housing or body.

The flapper disc is attached to a shaft journalled in a bore through the body transverse to the axis of the fluid opening, and spaced from the axis of the shaft, so that when the valve is closed, the disc will be in the plane of the seat. The edge of the disc is tapered to the same conical angle as the seat. The edge of the disc has a circumferential rectangular groove. The base of the groove is a cylindrical surface coaxial with the axis of the opening. The walls of the groove are perpendicular to the base. An O-ring is inserted in the groove.

When the valve is closed, the O-ring is slightly compressed in contact with the seat. However, since the O-ring is confined between a cylindrical surface and a conical surface, and since back pressure, tending to close the valve presses the O-ring in the direction of the taper of the seat, the seal is self energizing, providing a seal without leakage, even at low and high back pressures. Means are provided to precisely center the disc with respect to the seat.

BRIEF DESCRIPTION OF THE DRAWINGS

These and other objects and advantages of this invention and a better understanding of the principles and details of the invention will be evident from the following description taken in conjunction with the appended drawings, in which;

FIG. 1 shows a face view of the valve in partial cross section.

FIG. 2 shows in cross section a view taken along the plane 2—2 of FIG. 1.

FIG. 3 shows an enlarged detail of part of FIG. 2.

FIG. 4 shows a view taken along the plane 4—4 of FIG. 1.

DESCRIPTION OF THE PREFERRED EMBODIMENT

Referring now to FIGS. 1 and 2, there are shown two views of a preferred embodiment of this invention. There is a housing or body 10 having a central substantially circular opening 12. The body has a central circular portion with two projections along a diameter, said projections having end faces 28 and 30, respectively. There is a bored opening 35 through said projections. The axis 22 of the bored opening 35 is perpendicular to the axis 18 of said central opening, and displaced from the axis 18 a selected distance 19.

The body has two parallel faces 14, 16, which faces are adapted to be clamped between spaced parallel flanges of pipes comprising a pipe line into which this valve can be inserted, and sealed with conventional gaskets.

In the upstream face 14, that is, the face in the direction from which fluid flows into the opening 12, there is a bore 48 into which is sealed a seal ring 46, which seats against the shoulder 50. The seal ring is held in place and sealed against leakage by a gasket 41 shown in dashed outline, against which the pipe flange seats.

The seal ring 46 has an internal surface 60 which is a conical surface, tapering in the direction upstream of the fluid flow. This conical surface is tangent to a spherical surface shown as 49 in FIG. 2, and of radius 44. The center of the sphere is on the axis 18 at the intersection of a transverse plane 20 through the axis 22.

A flapper disc is supported by bosses 34 on its back surface, which are spaced apart, and serve to support the disc 32 from a shaft 24, 24', which may be a single shaft, or two colinear shafts. Two separate shaft are preferred, so as to have as much of the opening 12 clear for the flow of fluid. The disc 32 can be attached to shafts 24, 24' by means such as pins 36. The shafts are journaled in bushings 26 pressed into a larger bored opening 33.

The disc 32 has its edge 55 cut to the same taper as the seating surface 60 of the seal ring 46. There is, of course, sufficient clearance 57 between the two surfaces 55, 60 to permit the free rotation of the disc 32 about the axis 22.

There is a rectangular circumferential groove 47 in the edge of the disc 32, for holding an O-ring 58. The groove has a cylindrical base 52 and parallel walls 54, 56 which are perpendicular to the cylindrical surface 52.

As can be seen from the enlarged view in FIG. 3 of a circled portion (numeral 3) of FIG. 2, the O-ring is confined in a wedge-shaped annular space between the cylindrical surface 52 and the conical surface 60. The O-ring is slightly compressed as the disc 32 comes into seating position. This seals the back pressure from the downstream face of the housing. As this back pressure increases, fluid flows through the clearance 57 into the space 59 and forces the O-ring upstream (to the right in FIG. 3). This pressure in space 59 causes the O-ring to be compressed and to provide a self energizing seal. The clearance 57 is too small for the O-ring to be extruded through, so a complete and perfect seal results. Still, when the back pressure is removed, the O-ring resumes its original shape, and since there is only slight compression against the surface 60, the disc is free to rotate, and has a minimum of resistance to flow of fluid in the direction of arrow 51.

Referring back to FIG. 1, there is shown on the right, an O-ring seal 27 between the shaft 24 and the bored opening 33. Two bushings 26, 26 are pressed into the opening 33 from the open end at surface 28. On the other shaft, 24' there are similarly O-ring 27 and bushings 26, 26.

Because of the small clearance between the disc 32 and the seat 46, it is important that means be provided to precisely center the disc 32 in the seal ring opening. This is accomplished by clamping, in the outer end of the opening 33, a nut 25. This is sealed into the opening 33 by O-ring 27', and is locked into the opening by screws such as 29 locking the flange 19 to the surface 28 of the body. There is a threaded axial opening in the nut 25.

A cup-shaped cap 35 is attached to the end of shaft 24 by means such as pin 21. The cup has an axial opening for the passage of a screw 17. The screw head 23 is inside the cup, and the position of the cup is such as to provide a minimum of end play for the head, although it is free to turn in the opening in the cup. The screw is threaded through the nut 25 and extends to the outside of the body, where it has a slot 17. When the nut 25 is locked by means of flange 19, the shaft can be moved axially by turning the screw by means of slot 17. This provides a precise positioning means to center the disc in the seat. After the shaft is properly positioned the screw is locked to the body by means of lock nut 31.

In the use of a check valve, it is important that on the appearance of back flow of fluid, that the valve close immediately. In the normal type of check valve, the flapper is closed due to its weight. In this valve, because of the offset of the disc, gravity forces alone will not close the disc. Also, if there is friction of the shaft, the disc will not close. However, to prevent back flow, there must be a seal at all times that there is no forward flow of liquid. Consequently, a spring torque of adjustable magnitude is provided to ensure that the disc is pressed in sealing contact with the seat ring.

On the other end of the body, at surface 30, the shaft 24' extends to the outside of the valve body. There is a spring housing, 62 that is bored to slide on the shaft 24'. On its inner end, the spring housing is counterbored 66 to a larger diameter corresponding to the outer diameter of the bushings 26. There is a short bushing 61 inserted part way into the bored opening 33 in the body, and the spring housing 62 is positioned over the bushing 61.

In the annular space between the shaft 24' and the counterbore 66, there is positioned a helical wire spring 65. One end of the spring is hooked to a transverse pin 68 in shaft 24'. The other end of the spring is inserted into a drilled hole 70 in the outer end of the spring housing (see FIG. 4). The spring housing 62 has a flange 64 which is clamped to the surface 30 by means such as screws 29. By rotating the spring housing, a selected value of torque can be applied to the shaft. When the proper value of torque is reached, the spring housing is clamped to surface 30, and thereafter when fluid flow stops, the disc is closed, sealing against back flow. In this embodiment the spring is installed outside of the valve, away from contact with the fluid carried by the valve, yet it is entirely enclosed and protected from damage. The adjustment of the spring to proper torque has no effect on the centering of the disc, since there is no clamp between the spring housing and the shaft.

Since the spring can be adjusted after the valve is installed in a line, it permits the check valve to be used with fluids of various densities and viscosities, etc., and can be used in vertical as well as horizontal lines.

In construction of the disc, the annular space 57 between the tapered edge of the disc and tapered seating surface is made as small as practicable, while permitting sufficient clearance for the disc to move in and out of its seating surface. This radial distance is in the range of 0.005 to 0.008 inch. This small spacing prevents the O-ring from extruding into this annular space under normal pressure.

In the closed position of the disc, the O-ring is slightly flattened so as to make a complete seal. However, this flattening need only be in the range of 2 to 4 percent of the diameter of the ring. The material of which the O-ring is made is of course, the conventional material for the type of fluid involved.

The value of spacing 72 between the plane of the O-ring 58 in the disc and the axis 22 is selected for mechanical reasons. It is desireable to make the spacing as large as possible in order to take advantage of the taper of the seating surface. On the other hand, the overall thickness of the body, that is the spacing between faces 14 and 16, should be kept as small as possible, for convenience in installation.

What has been described is a check valve that seals with only a slight back pressure and provides a self energizing seal, to effectively seal against both low and high back pressure.

While the invention has been described with a certain degree of particularity, it is manifest that many changes may be made in the details of construction and the arrangement of components. It is understood that the invention is not to be limited to the specific language used or the specific embodiments set forth herein by way of exemplifying the invention, but the invention is to be limited only by the scope of the attached claim or claims, including the full range of equivalency to which each element or step thereof is entitled.

What is claimed:

1. A check valve comprising:
  a. a body having a substantially circular first opening therethrough for the flow of fluid, and parallel faces perpendicular to the first axis of said first opening, one of said faces being an upstream face, and the other a downstream face, said body adapted to be clamped between spaced parallel pipe flanges;
  b. a second cylindrical opening through said body, the second axis of said second opening perpendicular to said first axis, and displaced a selected distance from said first axis in a direction parallel to said faces, and shaft means journaled in said second opening;
  c. circular ring seal means having a seating surface inserted into said body on said upstream face, said seal ring means comprising a ring of rigid material, the seating surface of which comprises a conical surface, said conical surface tapering toward said upstream face, and tangent to a sphere having a center at the point where said first axis intersects a perpendicular plane passing through said second axis;
  d. disc means rigidly fastened to said shaft means and having a circular face, and conical tapered edge, the angle of said conical taper being the same as that of said seating surface;

e. a circumferential rectangular groove in said tapered edge, the base of said groove cylindrical, and coaxial with said disc, the walls of said groove perpendicular to the cylindrical base of said groove, the plane through the center of said groove displaced a selected distance along said first axis from said perpendicular plane toward said upstream face; and f. O-ring means in said groove;

whereby when said shaft is turned so that the plane of said disc is parallel to the plane of said ring seal means, said O-ring will press against said seating surface and seal the fluid passage through said first opening.

2. The check valve as in claim 1 including means to axially position said shaft means so as to center said disc on said seating surface.

3. The check valve as in claim 2 including;

a. cylindrical cup means having an axial opening in the base of said cup means;

b. screw means inserted through said opening with the screw head inside of, and rotatable in said cup means;

c. means to position and fasten said cup means over one end of said shaft means, said screw head having limited axial clearance between the end of said shaft and the base of said cup;

d. first nut means on said screw means, and means to lock said first nut means to said body;

e. means exterior of said body to rotate said screw means; and f. second nut means to lock said screw means.

4. The check valve as in claim 1 including means to exert an adjustable value of torque on said shaft means.

5. The check valve as in claim 4 in which said means to exert a torque comprises;

a. means to extend a second end of said shaft means outside of said body;

b. helical wire spring means positioned about said shaft extension;

c. means to attach one end of said spring means to said shaft means;

d. cylindrical housing means surrounding said spring means, and rotatable about said shaft, and means to attach a second end of said spring means to said spring housing means; and e. means to clamp said spring housing means to said body.

6. The check valve as in claim 1 in which the radial spacing of said tapered edge of said disc from said tapered seating surface is in the range of 0.005 to 0.008 inch.

7. The check valve as in claim 1 in which the preload on said O-ring in contact with said seating surface causes a flatening of said O-ring in the range of 2 to 4 percent of the cross sectional diameter of said ring.

* * * * *